W. O. CAMPBELL.
Milk-Coolers.

No. 136,584. Patented March 11, 1873.

WITNESSES.
John A. Ellis.
Wm. K. Ellis.

INVENTOR.
Warren O. Campbell.
Per.
C. H. Watson & Co
Attys.

AM. PHOTO-LITHOGRAPHIC CO. N.Y. (OSBORNE'S PROCESS.)

UNITED STATES PATENT OFFICE.

WARREN O. CAMPBELL, OF MONTGOMERY CENTRE, VERMONT.

IMPROVEMENT IN MILK-COOLERS.

Specification forming part of Letters Patent No. 136,584, dated March 11, 1873.

*To all whom it may concern:*

Be it known that I, W. O. CAMPBELL, of Montgomery Centre, in the county of Franklin and State of Vermont, have invented certain new and useful Improvements in Milk Pan and Cooler; and I do hereby declare that the following is a full, clear, and exact description thereof, that will enable others skilled in the art to which it appertains to make and use the same, reference being had to the accompanying drawing, and to the letters of reference marked thereon, which form a part of this specification.

The nature of my invention consists in the construction and arrangement of a milk pan and cooler, with frame for supporting the same, as will be hereinafter more fully set forth.

In order to enable others skilled in the art to which my invention appertains to make and use the same, I will now proceed to describe its construction and operation, referring to the annexed drawing, in which—

Figure 1:
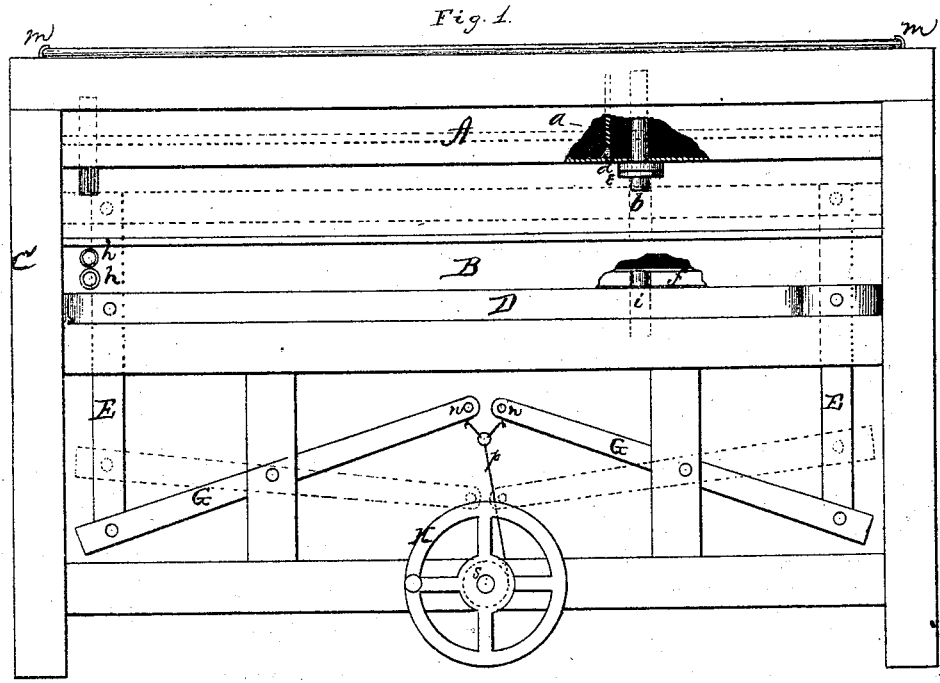
Figure 2:
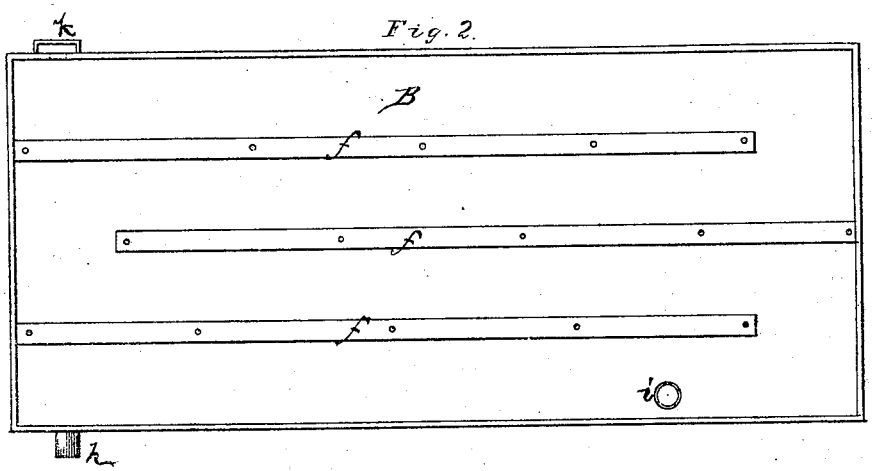

Figure 1, is a side elevation, part in section, showing the frame with the pan and cooler; and Fig. 2 is a plan view of the cooler.

A represents the milk-pan, which may be made of tin or any other suitable material, and provided with one or more movable transverse partitions, a, dividing the pan into two or more compartments. This is of great convenience, as during certain seasons of the year the same number of cows will give less milk than at other times, and by the aid of these partitions the pan can be made to suit any quantity. It is also convenient where dairy-men some seasons have more cows than at other seasons, and can accommodate their pans to the quantity of milk, without the expense of having several different-sized sets of pans. The pan A is, in the bottom, provided with one or more outlet-tubes b, projecting downward for a suitable distance, and around each tube b is placed a cork or wooden washer d, and a rubber washer, e, the former being against the bottom of the pan to protect the rubber washer from the heat while scalding the pan. B represents the cooler, made of wood, tin, or other suitable material, of such size that pan A will fit within the same and rest upon ribs or flanges f f attached in the bottom of the cooler. These ribs or flanges may be made of any suitable material, and covered on their upper edges with rubber, leather, or other soft or elastic material, so as to form a tight joint with the bottom of the milk-pan when the same is put in its place. The ribs or flanges f f are arranged in the manner shown in Fig. 2, so as to form a tortuous channel for the cooling or tempering material (water, steam, or air) used. The water, steam, or air, is let in at or near one end of the cooler, at k, and on the opposite side are two outlets, h h, one above the other, the upper one only being open when in use, so as to have a steady current of water under the bottom of the milk-pan and against it. The lower outlet is used only when the cooler is to be emptied of water while the milk-pan is yet in the cooler. The cooler B is further provided with one or more tubes, i, in the bottom, of such size that the ends of the tubes b of the milk-pan may fit in the same, and, with the washers d e, form tight joints when the pan and cooler are together. The milk may thus be drawn off from the pan even when it is surrounded by the cooler, and, the partition being provided with a suitable gate or passage, the milk may be drawn off from either compartment with ease and rapidity. When the cooler is removed from the pan the water will run out through said tube or tubes i. The frame C is constructed in any suitable manner to receive in its upper part the milk-pan A, which is held permanently in position by hooks m m, which may, however, be turned to one side to remove the pan when desired. Below the pan A, and in the frame C, is a movable frame, D, supporting the cooler B. The movable frame D rests upon suitable bars in the main frame, and near each corner it has a bar, E, which passes downward through a mortise in a bar of the main frame, and its lower end pivoted to a lever, G. This lever is in turn pivoted to the main frame, and the inner ends of the two levers at each end of the frame are connected by a rod or bar, n. The inner ends of all the levers are then, by cords or chains p, connected with a roller, s, located transversely in the center, near the bottom of the main frame C, and has on one end a crank-wheel, H, by means of which it may be turned, thereby raising the cooler B up to and against the pan A. The wheel H should be locked when in this position, so as to retain the cooler in place.

Having thus fully described my invention, what I claim as new, and desire to secure by Letters Patent, is—

1. The milk-pan A, provided with one or more movable transverse partitions, $a$, and one or more tubes, $b$, each tube having washers $d$ and $e$, all substantially as and for the purposes herein set forth.

2. The combination of the movable frame D, bars E E, levers G G, cords or chains $p\ p$, roller $s$, and wheel H, all arranged in the main frame C, and used with the pan A and cooler B, substantially as and for the purposes herein set forth.

In testimony that I claim the foregoing I have hereunto set my hand.

WARREN O. CAMPBELL.

Witnesses:
AARON W. BUNDY,
JANE MASON.